(12) United States Patent
Eggers et al.

(10) Patent No.: US 7,417,201 B2
(45) Date of Patent: Aug. 26, 2008

(54) SWITCHING ARRANGEMENT FOR ACTUATING LIGHTING SYSTEMS ON A MOTOR VEHICLE

(75) Inventors: Helmuth Eggers, Ulm (DE); Gerhard Kurz, Wendlingen (DE); Juergen Seekircher, Ostfildern (DE); Thomas Wohlgemuth, Aichtal (DE)

(73) Assignee: Daimler AG, Stuttgart (DE)

( * ) Notice: Subject to any disclaimer, the term of this patent is extended or adjusted under 35 U.S.C. 154(b) by 303 days.

(21) Appl. No.: 10/532,623

(22) PCT Filed: Oct. 17, 2003

(86) PCT No.: PCT/EP03/11518

§ 371 (c)(1),
(2), (4) Date: Apr. 25, 2005

(87) PCT Pub. No.: WO2004/037607

PCT Pub. Date: May 6, 2004

(65) Prior Publication Data

US 2006/0049029 A1    Mar. 9, 2006

(30) Foreign Application Priority Data

Oct. 24, 2002    (DE) ............................... 102 49 817

(51) Int. Cl.
*H01H 9/00*    (2006.01)
(52) U.S. Cl. .................. 200/310; 200/61.54; 200/1 B; 200/336; 315/157; 362/510
(58) Field of Classification Search ............. 200/61.54, 200/61.27, 61.31–61.32, 333–336, 17 R, 200/1 B, 564; 315/82, 157–159; 362/510, 362/255–256, 551–554, 294

See application file for complete search history.

(56) References Cited

U.S. PATENT DOCUMENTS

| 5,717,398 | A  | 2/1998 | Pollin |
| 6,034,337 | A  | 3/2000 | Siegert |
| 6,288,492 | B1 | 9/2001 | Wolfe |
| 6,396,011 | B1 | 5/2002 | Glowczewski et al. |
| 2001/0019482 | A1 | 9/2001 | Kobayashi et al. |

FOREIGN PATENT DOCUMENTS

| DE | 25 22 210 A  | 11/1976 |
| DE | 39 32 216 A1 | 4/1991  |
| EP | 0426538 B1   | 11/1994 |
| EP | 0 765 775 A1 | 4/1997  |
| EP | 1 191 279 A2 | 3/2002  |
| FR | 2 772 511 A  | 6/1999  |
| FR | 2 818 933 A  | 7/2002  |

*Primary Examiner*—K. Richard Lee
(74) *Attorney, Agent, or Firm*—Stephen A. Pendorf; Patent Central LLC

(57) ABSTRACT

Future motor vehicles will require additional lighting means. Additional lighting means are required, above all, in conjunction with environmental sensors, especially sensors which are used in night vision systems. As a result of the generally increasing number of electric and electronic systems in motor vehicles, such systems must be easy to operate for the driver. The invention thus relates to a switching arrangement which enables a plurality of lighting systems to be ergonomically operated on one motor vehicle. Said switching arrangement comprises a single switch having a plurality of switching stages. In this way, all switching stages pertaining to different lighting systems are located in the same switching region, enabling the lighting systems to be operated in a simple and intuitive manner.

12 Claims, 1 Drawing Sheet

SWITCHING ARRANGEMENT FOR ACTUATING LIGHTING SYSTEMS ON A MOTOR VEHICLE

CROSS REFERENCE TO RELATED APPLICATION

This application is a national stage of PCT/EP2003/011518 filed Oct. 17, 2003 and based upon DE 102 49 817.2 filed Oct. 24, 2002 under the International Convention.

BACKGROUND OF THE INVENTION

1. Field of the invention

The invention relates to a switching arrangement for actuating lighting systems on a motor vehicle.

2. Related Art of the Invention

Modern motor vehicles already have different lighting means such as, for example, headlights, fog headlights and rear fog lights. It will be necessary with future motor vehicles to install additional lighting means. Additional lighting means are becoming necessary, chiefly, in conjunction with sensors that detect the environment, particularly sensors such as are used in night vision systems. Owing to the overall rising number of electrical and electronic systems in motor vehicles, it is also necessary in addition that such systems be easy to operate by the driver. The use of multistage switches in conjunction with simple switching concepts render it possible for the lighting means of a motor vehicle to be operated simply and intuitively.

The German patent application of the applicant having the official file reference 10126492.5, which is not a prior publication, discloses a method for improving vision in vehicles, in particular in darkness, bad weather and fog. In the method presented, laser light with a wavelength outside the visible spectrum is emitted into a prescribed solid angle region. The illuminated solid angle region is observed by means of a camera and the images thereof are shown to the driver. One or more laser headlights are fitted on the vehicle for illuminating the solid angle region. In order not to endanger other road users, the laser headlights are operated continuously only when the headlights of the vehicle are also in operation, in particular when the upper beam or lower beam is switched on. Laser headlights are also operated continuously only when the vehicle is being driven. Information as to whether the normal headlights of a vehicle are in operation or whether a vehicle is being driven are automatically available in modern motor vehicles that have an onboard computer. On the other hand, this information can easily be obtained by means of very simple electrical or electronic systems. The operation of the headlamps is a reliable indication that the night vision device is actually required. If the headlamps are switched off, the night vision device is then also disconnected, which means that the laser headlights can no longer constitute any sort of danger.

Apparatuses are known which are fitted on a vehicle and are automatically switched on or switched off on the basis of the vehicle's own movement. For example, US document with the patent number U.S. Pat. No. 5,717,398 indicates an apparatus for detecting radar and/or laser radiation in conjunction with a vehicle. The power supply of the apparatus consists of solar cells and rechargeable batteries. An additional circuit is provided on the apparatus in order to keep the power consumption low. The circuit is used to disconnect the power supply of the radar and/or laser detector if the vehicle does not move on for longer than a prescribed period of time. The radar and/or laser detector is automatically resupplied with power as soon as the vehicle moves. The movement of the vehicle can be ascertained in this case on the basis of the acceleration, for example.

Rotatably mounted light switches are known from Mercedes Benz vehicles. These light switches are fitted on the left next to the steering wheel on the cockpit. In this case, the parking light is actuated by a clockwise rotation at the switch in a first switching stage, and the lower beam is actuated in a second switching stage. By means of a counterclockwise rotation, the right-hand parking light is switched on in a first switching stage, and the left-hand parking light is switched on in a second switching state. In the "lower beam" switching stage, the fog headlight is activated in a first switching stage by pulling on the switch, and the rear fog light is activated in a second switching stage.

The European patent with the patent number EP0426538 B1 discloses a switching arrangement for actuating the headlights as well as the fog headlights and the rear fog lights of a motor vehicle. The switching arrangement consists in this case of the combination of three switches. In this case, the "parking light off-lower beam/upper beam" positions can be selected for the headlights by means of a main selector switch that is rotatably installed in a housing. Additional lighting selector switches are provided at the main selector switch for the fog headlights and the fog rear lights, it being possible for these additional lighting selector switches to adopt an initial position and an actuating position in which the rear fog lights and the fog headlights are switched off or switched on. The actuation of the additional lighting selector switches is performed in the case of the rear fog lights by means of a slide that is arranged in relation to the main selector switch such that it can move rectilinearly between the two positions of the rear fog light switch. The fog headlight switch is installed such that it can rotate coaxially in relation to the main selector switch. Furthermore, the main selector switch and the additional lighting selector switches are provided with projections and ramp means such that the rear fog light switch is reinitialized when the main selector switch returns to the "off" position. The rear fog light switch is likewise reinitialized when the main selector switch is in the "parking light" position and the fog headlight switch returns to the initial position.

A system for supporting the driver's vision during night driving is presented on the website of the Toyota Motor Corporation (www.toyota.co.jp/Showroom/All toyota lineup/LandcruiserCygnus/safety/index.html). Operating the system requires that the night view switch be actuated, the switch being a customary switch. In this case, the switch is located in a switching area provided specifically therefor and is arranged at a separate site by contrast with the switches of other lighting systems such as, for example, the main light.

SUMMARY OF THE INVENTION

It is the object of the invention to create a possibility for the ergonomic operation of two different types of lighting systems on a motor vehicle.

In accordance with the invention, the object is achieved by means of a switching arrangement having a switch for actuating a first lighting system for emitting visible light having a number of lighting states with a lower beam and an upper beam, and for actuating a second lighting system for emitting visible light of at least one further lighting device, the switch having a number of switching stages representing lighting states for actuating the lighting systems, wherein the switch has an additional switching stage for actuating a third lighting system, which emits light in the infrared wavelength region or in the non-visible wavelength region, wherein the arrangement of the switching stages of the switch is fixed in such a way that the second and the third lighting system can be switched on only after the switching stage representing the lower beam, and wherein it is possible for the second and the third lighting systems to be operated independently of one another. Advantageous refinements and developments of the invention are indicated in the dependent claims.

The invention is based on a switching arrangement for actuating lighting systems on a motor vehicle. In this case, a first lighting system having a number of lighting states with a lower beam and an upper beam emits visible light. A second lighting system emits light whose wavelength region is in the infrared or in the non-visible wavelength region. An ultraviolet lighting or an mm-wave radar can be involved here, for example. In this case, the switching arrangement comprises a single switch that has a number of switching stages representing lighting states for actuating the two lighting systems. In a way according to the invention, the arrangement of the switching stages of the switching arrangement is fixed in this case in such a way that the second lighting system can be switched on only after the switching stage representing the lower beam. In a further alternative refinement of the invention according to the invention, the arrangement of the switching stages of the switching arrangement is fixed in such a way that the switching stage representing the upper beam can be switched on only after the actuation of the second lighting system.

According to the invention, the switch can be designed in such a way that it is rotatably mounted. Also conceivable is a switch that is mounted on a swivel axis in exactly the same way as a conventional upper beam switch.

It is advantageous in this case when all the switching stages can be actuated in the same direction, the switch latching tight at the respective position of a switching stage and being held in this position of itself.

In an advantageous way of the invention, the switching sequence of the switching arrangement is fixed in such a way that the second lighting system for the infrared or non-visible light can be switched on only after the actuation of the lower beam. Because of the intensity of illumination of the lower beam, persons can look in the direction thereof only for a short time, and are thereby also protected against the radiation of the non-visible light, likewise shining from this direction, of the second lighting system.

It is conceivable, as it were, to fix the switching sequence of the switching arrangement in such a way that the upper beam can be switched on only after the actuation of the second lighting system. This renders it possible to use the nonvisible light of the second lighting system even when oncoming traffic is present and the upper beam therefore cannot be switched on. Thus, the second lighting system can be designed for more remote areas whose illumination by means of previously actuated upper beams would dazzle the oncoming traffic.

In a particularly advantageous way, the arrangement of the switching stages of the switching arrangement can in this case be fixed mechanically, electromechanically or electronically, which offers an improved system safety by comparison with a fixing process of the switching sequence based on software. Thus, it is ensured, inter alia, that no malfunction occurs even in circumstances susceptible to disturbances. There is a malfunction in this case if, for example, the second lighting system for the infrared light cannot be switched on until after the actuation of the lower beam. There is also a malfunction if, for example, the upper beam can be switched on only after the actuation of the second lighting system.

In a further embodiment of the invention, the circuit arrangement has switching stages in one direction that do not latch tight, this being so in particular when a switching arrangement is involved that is mounted on a swivel axis. The direction is preferably a direction facing the driver. In this case, the driver holds the switch manually at the respective position of a switching stage. The nonvisible light of the second lighting system can thereby be used like a flashlight, as it were.

In an advantageous way of the invention, a pilot light is fitted on the switching arrangement. The pilot light serves the purpose of indicating the operation of additional lighting means. The driver thus has an overview at any time as to whether the second lighting system is activated. For example, if the vehicle drops below a prescribed minimum speed, it can happen that the second lighting system is disconnected automatically. Without a pilot light, the driver would not be informed in such a case that the lighting of the second lighting system is deactivated.

BRIEF DESCRIPTION OF THE DRAWINGS

Further features and advantages of the invention result from the following description of exemplary embodiments with the aid of the figures. Here, a first lighting system emits visible light, and a second lighting system emits light whose wavelength region is in the infrared or non-visible wavelength region. In the drawing.

DETAILED DESCRIPTION OF THE INVENTION

Figure 1:
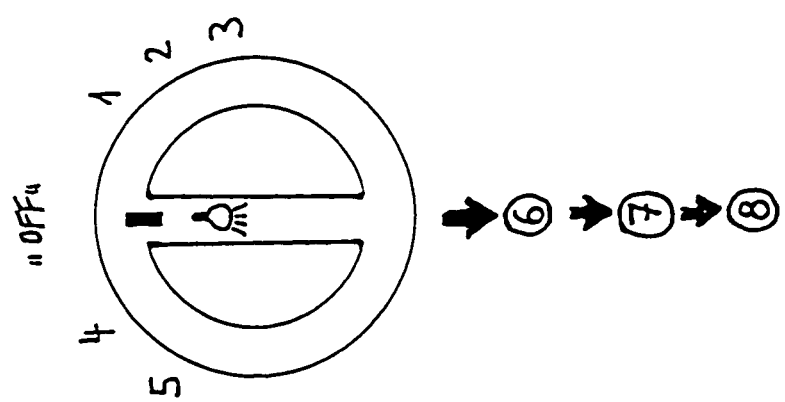
FIG. 1 shows a rotatably mounted switching arrangement.

FIG. 1 illustrates an exemplary switching arrangement for actuating lighting systems on a motor vehicle and which is rotatably mounted. The switching arrangement is used to actuate the headlights, parking lights, fog headlights, rear fog lights and the infrared lighting of the motor vehicle. All the lighting means are inactive in the "off" switching stage in this case. The parking light of the motor vehicle is switched on with the aid of the switching stage 1. The lower beam is actuated by means of the switching stage 2. In addition to the lower beam, the infrared lighting for the night vision system can be switched with the aid of the switching stage 3. The right and left parking lights are actuated with the aid of the switching stages 4 and 5, respectively. The fog headlights can be actuated with the aid of the switching stage 7 by pulling on the switch, and the rear fog lights can be actuated with the aid of the switching stage 8.

All the switching stages of the switching arrangement are designed in such a way that the switch latches tight at the respective position of a switching stage and is held in this position of itself.

It would also be conceivable alternatively that instead of the switching stage 3 there be provided upstream of the switching stages 7 and 8 a switching stage 6 by means of which the infrared lighting for the night vision system can be activated. By analogy with the switching stage 3, the switching stage 6 can be used to activate the infrared lighting only when the lower beam has already been switched on previously with the aid of the switching stage 2.

Figure 2:
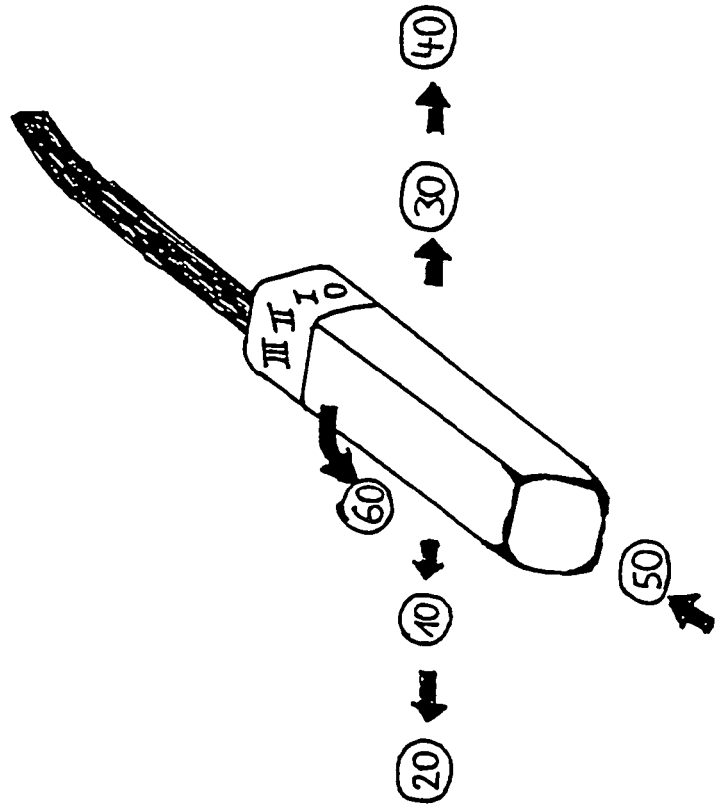
FIG. 2 shows a switching arrangement mounted on a swivel axis.

An exemplary switching arrangement for actuating lighting means on a motor vehicle and which is mounted by means of a swivel axis is illustrated in FIG. 2. The switching arrangement can be used, for example, to actuate the upper beams, flashlights and screen wipers of a motor vehicle. All the lighting means and the screen wipers are inactive in the basic position. The IR upper beam is switched on by means of switching stage 10, and the visible upper beam is actuated with the aid of the switching stage 20. The IR flashlight is activated with the aid of the switching position 30, and the visible flashlight is activated with the aid of the switching position 40.

The screen wiper is inactive at the switching position 0. On the basis of a rotary movement in the direction 60, intermittent wiping is performed with the aid of the position I, whereas normal wiping is actuated with the aid of the position II, and rapid wiping with the aid of the position III. Single wiping is achieved by actuating the switching stage 50.

The switching stages 10, 20, 0, I, II and III are designed in such a way that the switch latches tight at the respective position of a switching stage and is held in this position of itself, whereas the switching stages 30, 40 and 50 are designed in such a way that they do not latch tight and are held manually by the driver at the respective position of a switching stage.

The manner of operating will now be explained. An exemplary switching arrangement for actuating lighting systems on a motor vehicle is presented, which is rotatably mounted. The switching arrangement is used to actuate the headlights, parking lights, fog headlights, rear fog lights and the infrared lighting of the motor vehicle. All the lighting means are inactive in an "off" switching stage in this case. The parking light of the motor vehicle is switched on with the aid of a 1st switching stage. The lower beam is actuated by means of a 2nd switching stage. In addition to the lower beam, the infrared lighting for the night vision system can be switched with the aid of a 3rd switching stage. The right and left-hand parking lights are activated with the aid of further 4th and 5th switching stages, respectively. The fog headlights can be actuated with the aid of a 7th switching stage by pulling on the switch, and the rear fog lights can be actuated with the aid of an 8th switching stage.

All the switching stages of the switching arrangement are designed in such a way that the switch latches tight at the respective position of a switching stage and is held in this position of itself.

It would also be conceivable alternatively that instead of the 3rd switching stage there be provided upstream of the 7th and 8th switching stage a 6th switching stage by means of which the infrared lighting for the night vision system can be activated. By analogy with the 3rd switching stage, the 6th switching stage can be used to activate the infrared lighting only when the lower beam has already been switched on previously with the aid of the 2nd switching stage.

A further exemplary switching arrangement for actuating lighting means on a motor vehicle and which is mounted by means of a swivel axis is illustrated. The switching arrangement can be used, for example, to actuate the upper beams, flashlights and screen wipers of a motor vehicle. All the lighting means and the screen wipers are inactive in the basic position. The IR upper beam is switched on by means of a further 1st switching stage, and the visible upper beam is actuated with the aid of a further 2nd switching stage. The IR flashlight is activated with the aid of a further 3rd switching stage, and the visible flashlight is activated with the aid of a further 4th switching stage.

The screen wiper is inactive at a 0th switching position. On the basis of a rotary movement in a 1st direction, intermittent wiping is performed with the aid of a 1st position, whereas normal wiping is actuated with the aid of a 2nd position, and rapid wiping with the aid of a 3rd position. Single wiping is achieved by actuating a 5th switching stage.

The 1st and 2nd switching stages and the 0th, 1st, 2nd and 3rd switching positions are designed in such a way that the switch latches tight at the respective position of a switching stage and is held in this position of itself, whereas the 3rd, 4th and 5th switching stages are designed in such a way that they do not latch tight and are held manually by the driver at the respective position of a switching stage.

The invention claimed is:

1. A switch for actuating a first lighting system for emitting visible light having a number of lighting states with a lower beam and an upper beam, and for actuating a second lighting system for emitting visible light of at least one further lighting device, the switch having a number of switching stages representing lighting states for actuating the lighting systems, wherein the switch has an additional switching stage for actuating a third lighting system, which emits light in the infrared wavelength region or in the non-visible wavelength region, wherein the arrangement of the switching stages of the switch is fixed in such a way that the second and the third lighting system can be switched on only after the switching stage representing the lower beam of the first lighting system has already been switched on, and wherein it is possible for the second and the third lighting systems to be operated independently of one another.

2. The switch as claimed in claim 1, wherein said switch is rotatably mounted.

3. The switch as claimed in claim 1, wherein the switch is mounted by means of a swivel axis.

4. The switch as claimed in claim 1, wherein all the switching stages are actuated in the same direction, the switch latching tight at the respective position of a switching stage and being held in this position of itself.

5. The switch as claimed in claim 1, wherein a pilot light is fitted on the switch in order to indicate the operation of at least one of the second lighting system and the third lighting system.

6. A switch for actuating a first lighting system for emitting visible light having a number of lighting states with a lower beam and an upper beam, and for actuating a second lighting system for emitting light whose wavelength region is in the infrared or in the non-visible wavelength region, having a single switch that has a number of switching stages representing lighting states for actuating the two lighting systems, wherein the arrangement of the switching stages of the switch is fixed in such a way that the switching stage representing the upper beam of the first lighting system can be switched on only after the switching stage of the second lighting system has already been switched on.

7. The switch as claimed in claim 6, wherein in one direction, the switch has switching stages that cannot latch tight and can be held manually at the respective position of a switching stage.

8. The switch as claimed in claim 6, wherein in the direction facing the driver the switch has switching stages that cannot latch tight and can be held manually at the respective position of a switching stage.

9. The switch as claimed in claim 6, wherein the switch is rotatably mounted.

10. The switch as claimed in claim 6, wherein the switch is mounted by means of a swivel axis.

11. The switch as claimed in claim 6, wherein all the switching stages are actuated in the same direction, the switch latching tight at the respective position of a switching stage and being held in this position of itself.

12. The switch as claimed in claim 6, wherein a pilot light is fitted an the switch in order to indicate the operation of the second lighting system.

* * * * *